H. A. FOOTHORAP.
PLATEN AND PLATEN EQUIPMENT FOR TYPE WRITING MACHINES.
APPLICATION FILED FEB. 6, 1911.
1,268,954.
Patented June 11, 1918.
9 SHEETS—SHEET 1.
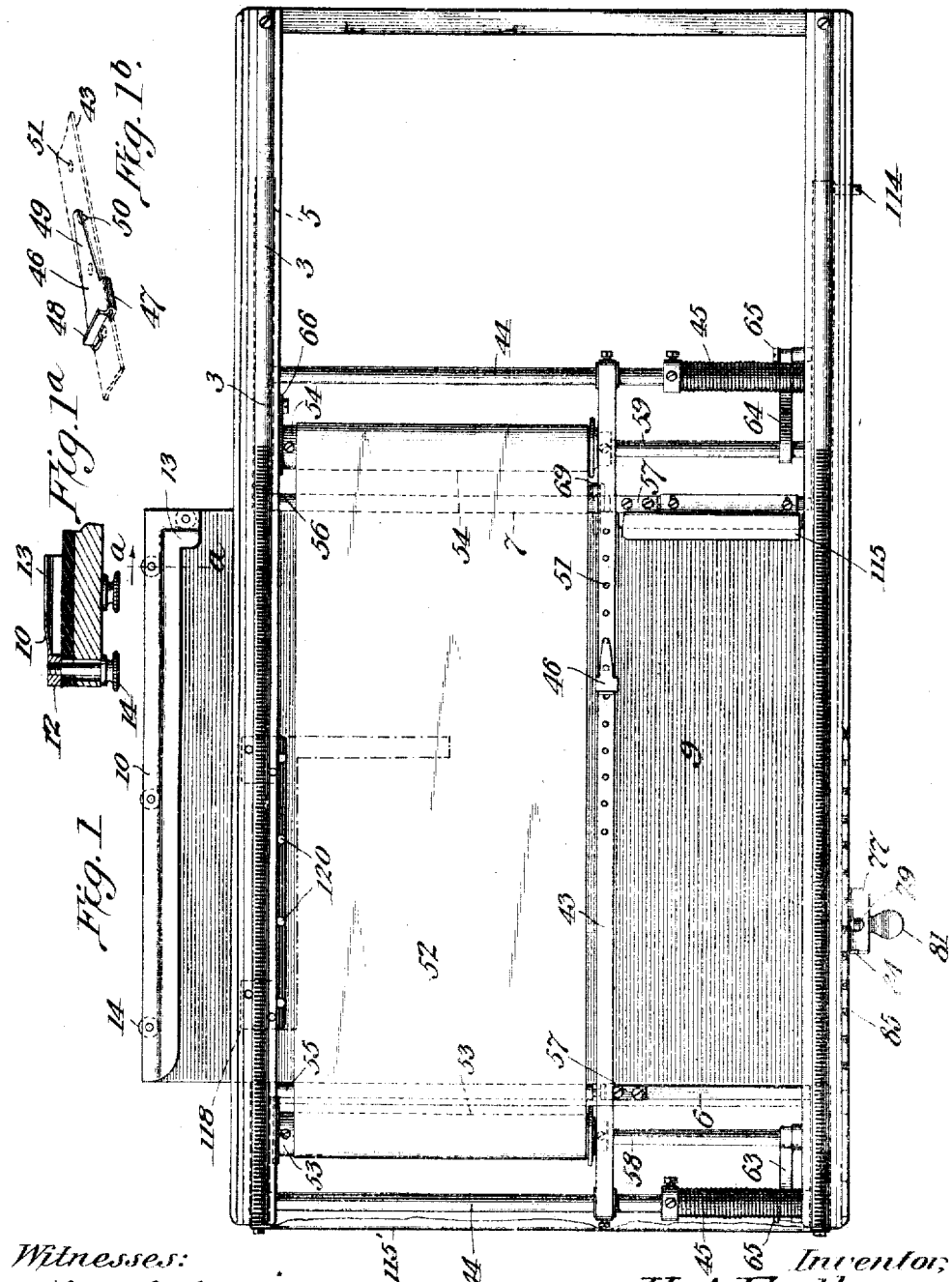

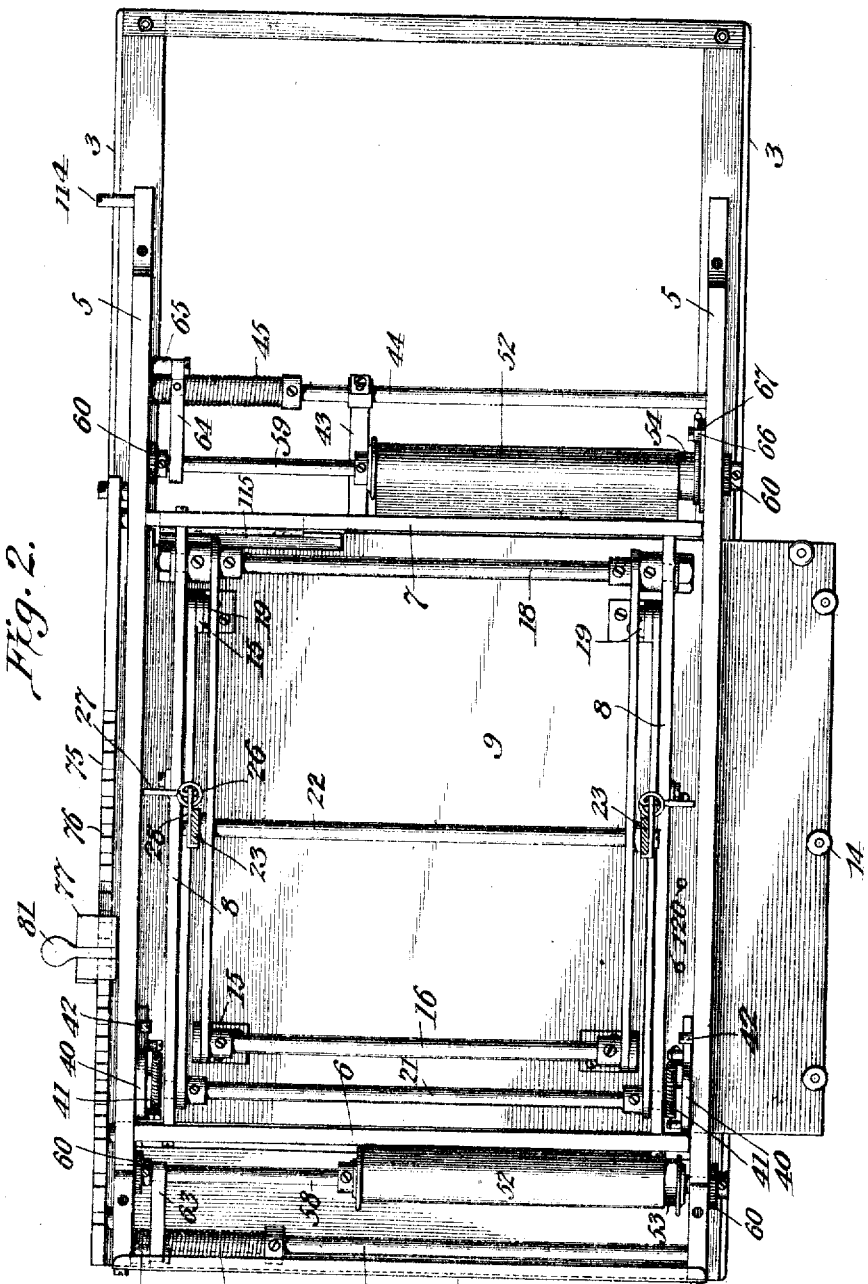

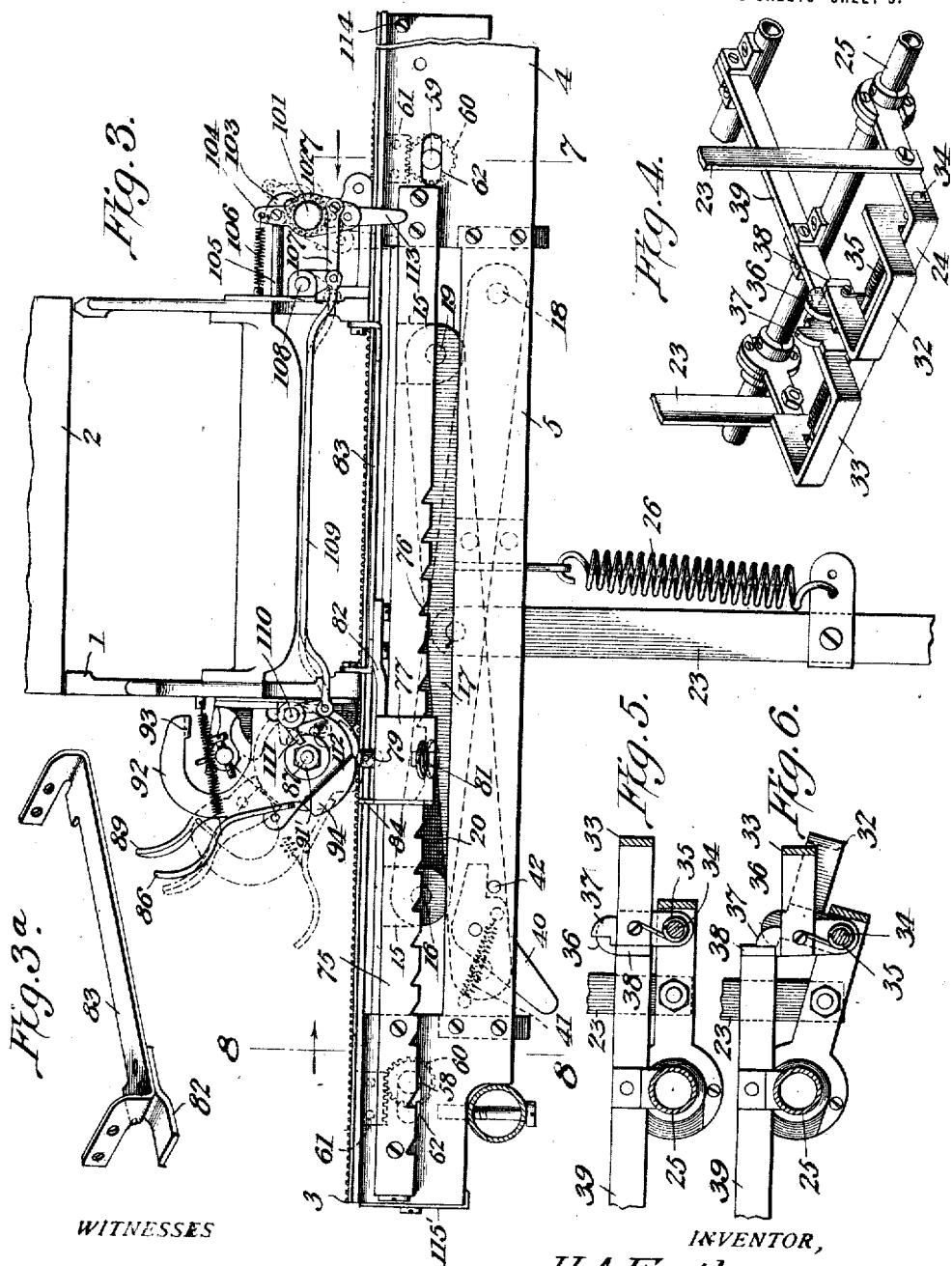

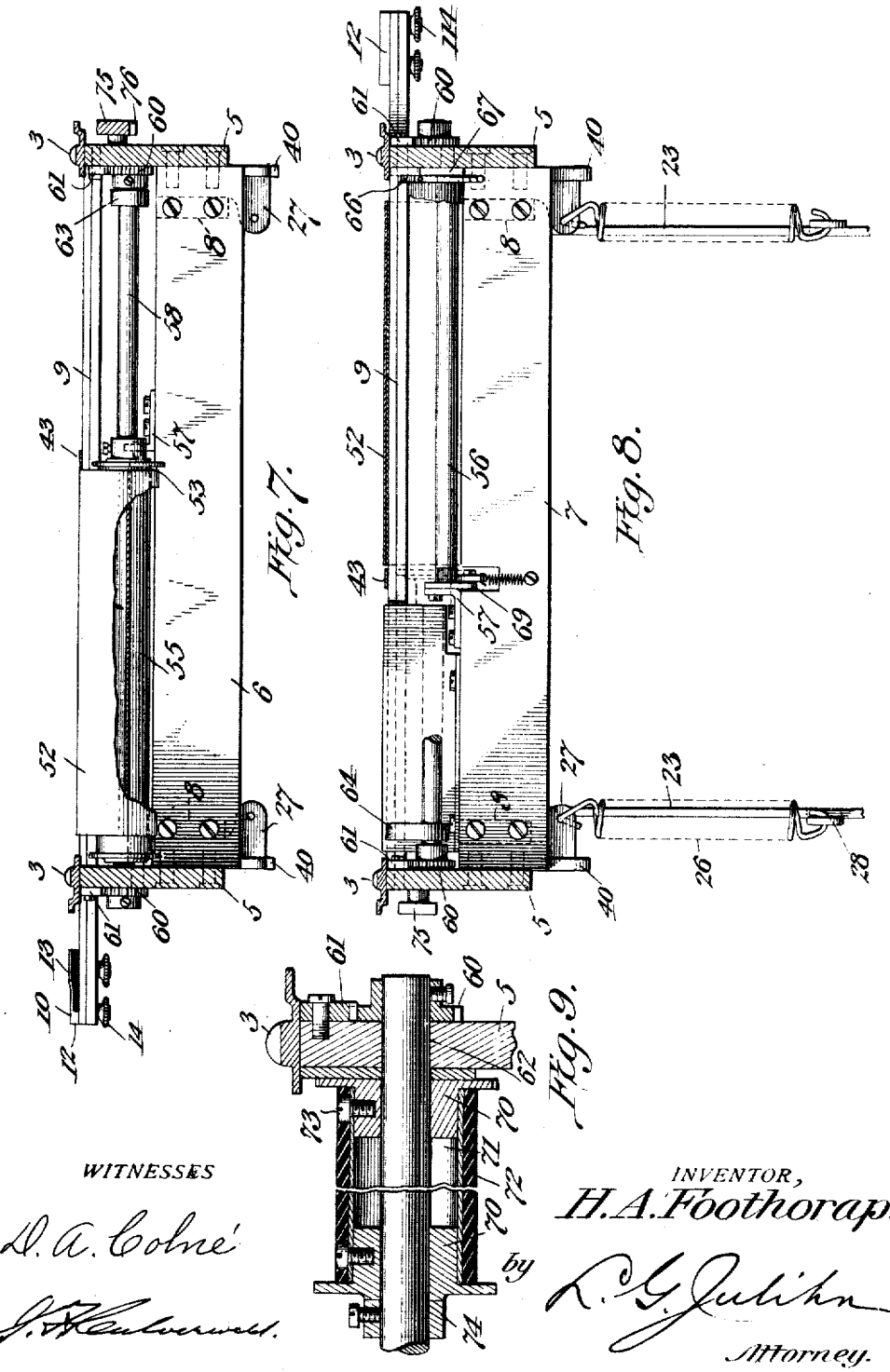

H. A. FOOTHORAP.
PLATEN AND PLATEN EQUIPMENT FOR TYPE WRITING MACHINES.
APPLICATION FILED FEB. 6, 1911.
1,268,954.
Patented June 11, 1918.
9 SHEETS—SHEET 5.
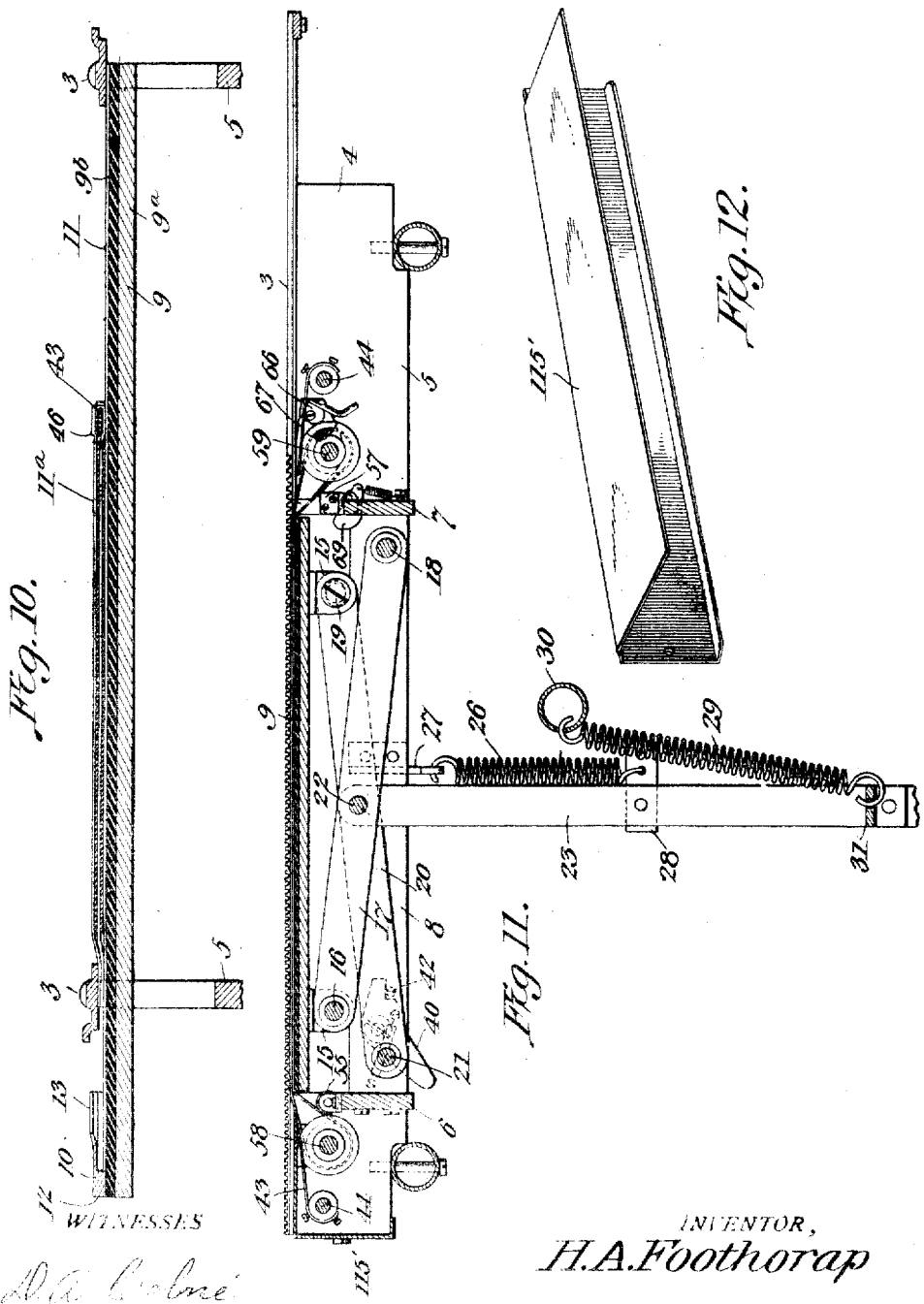

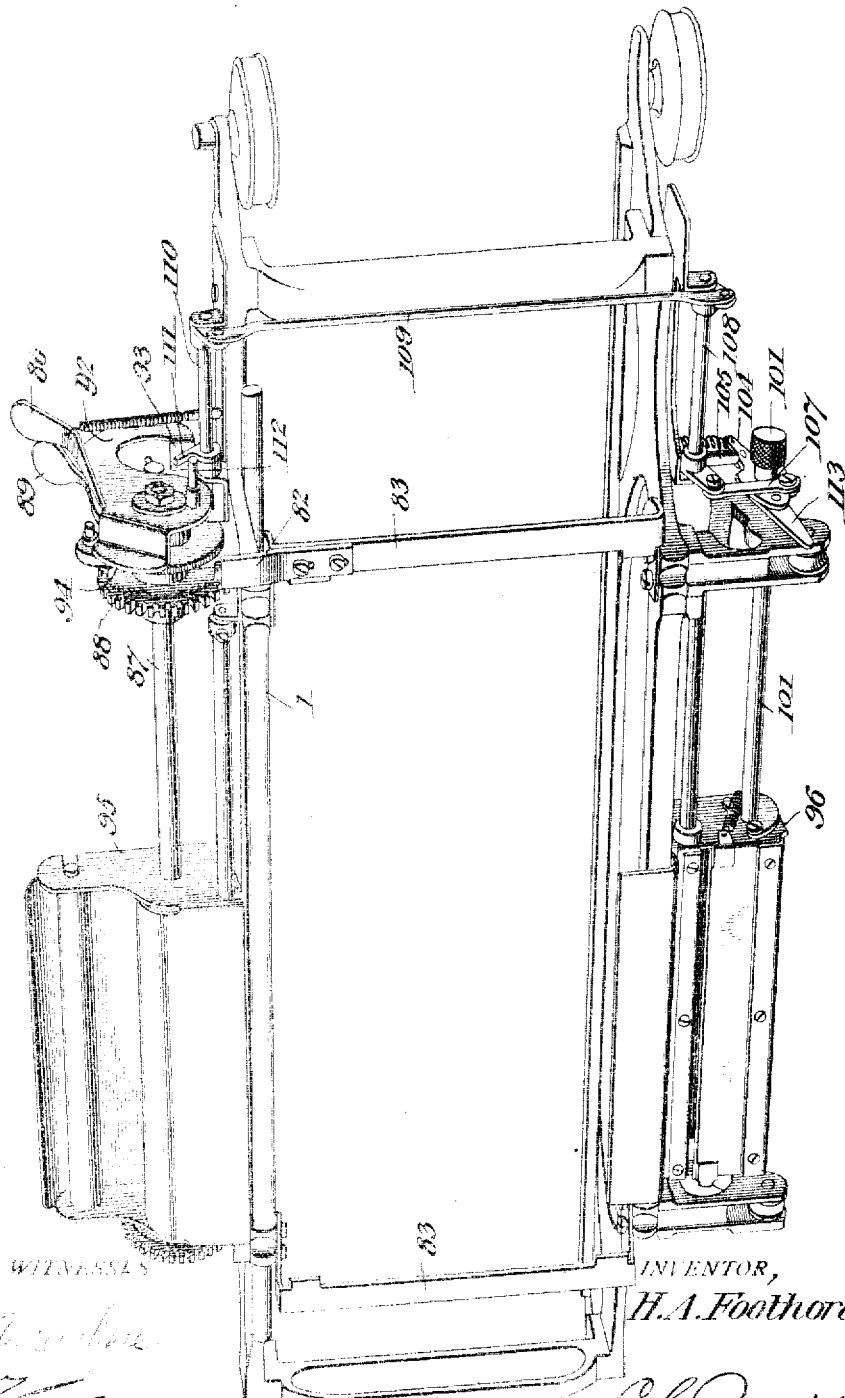

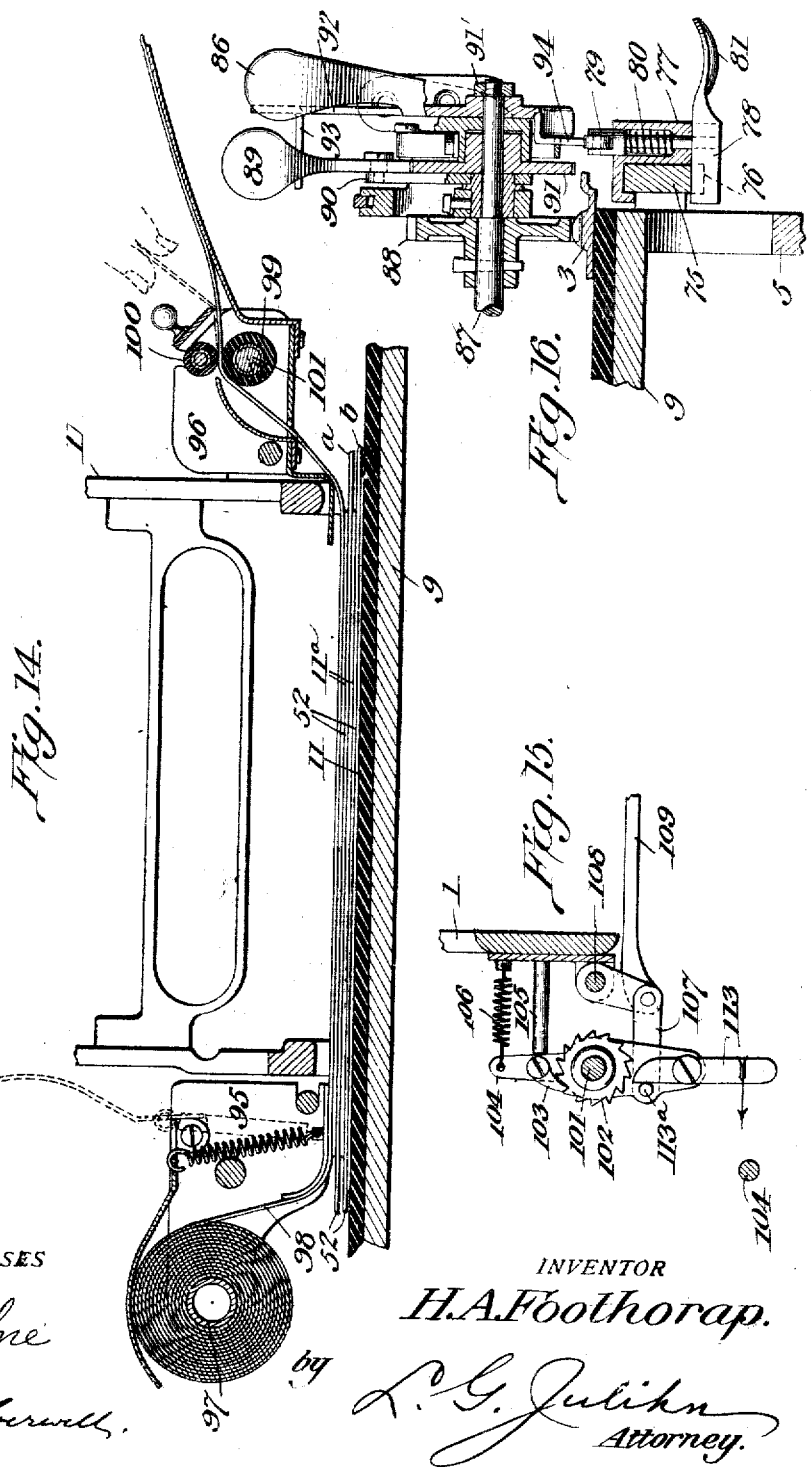

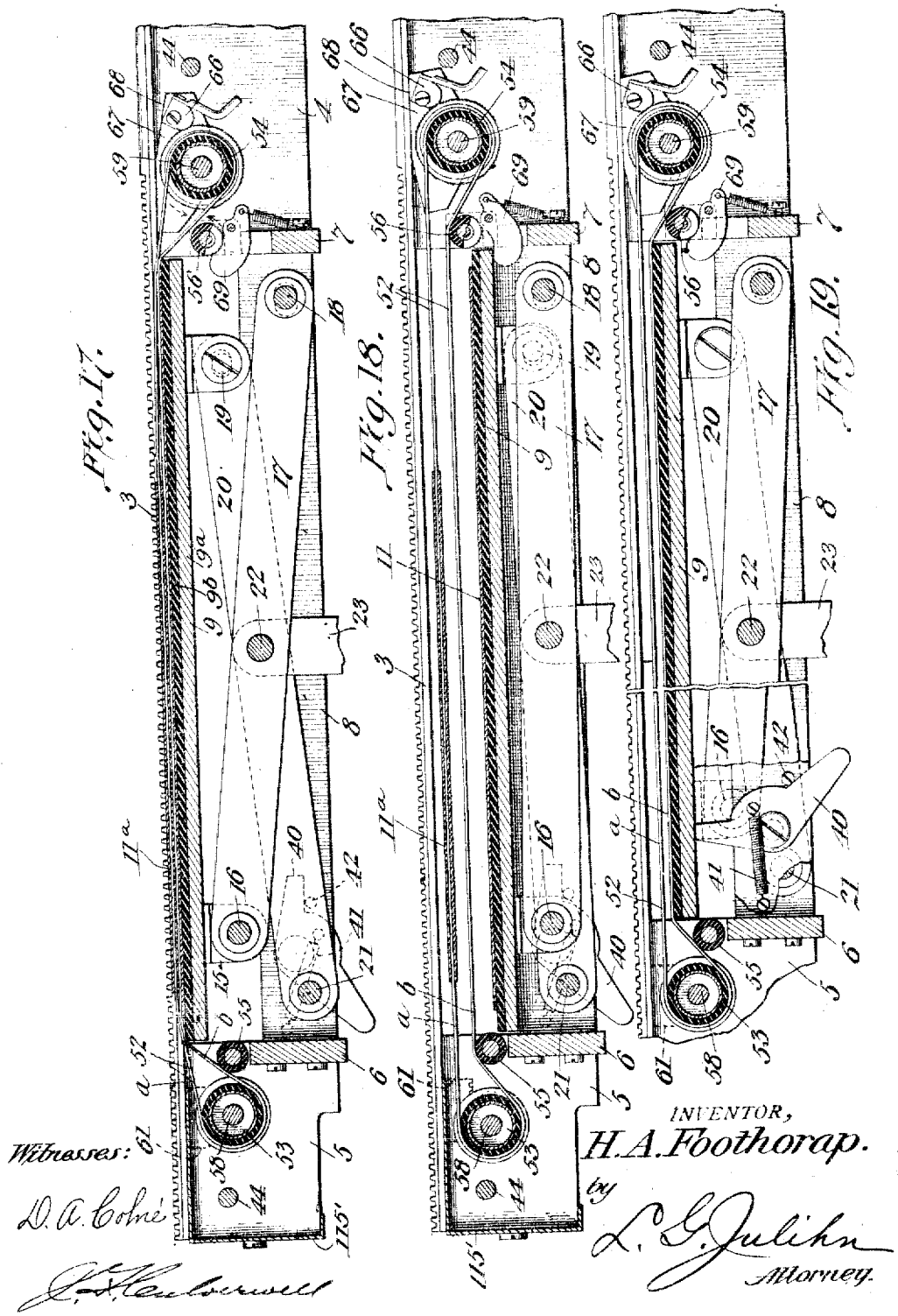

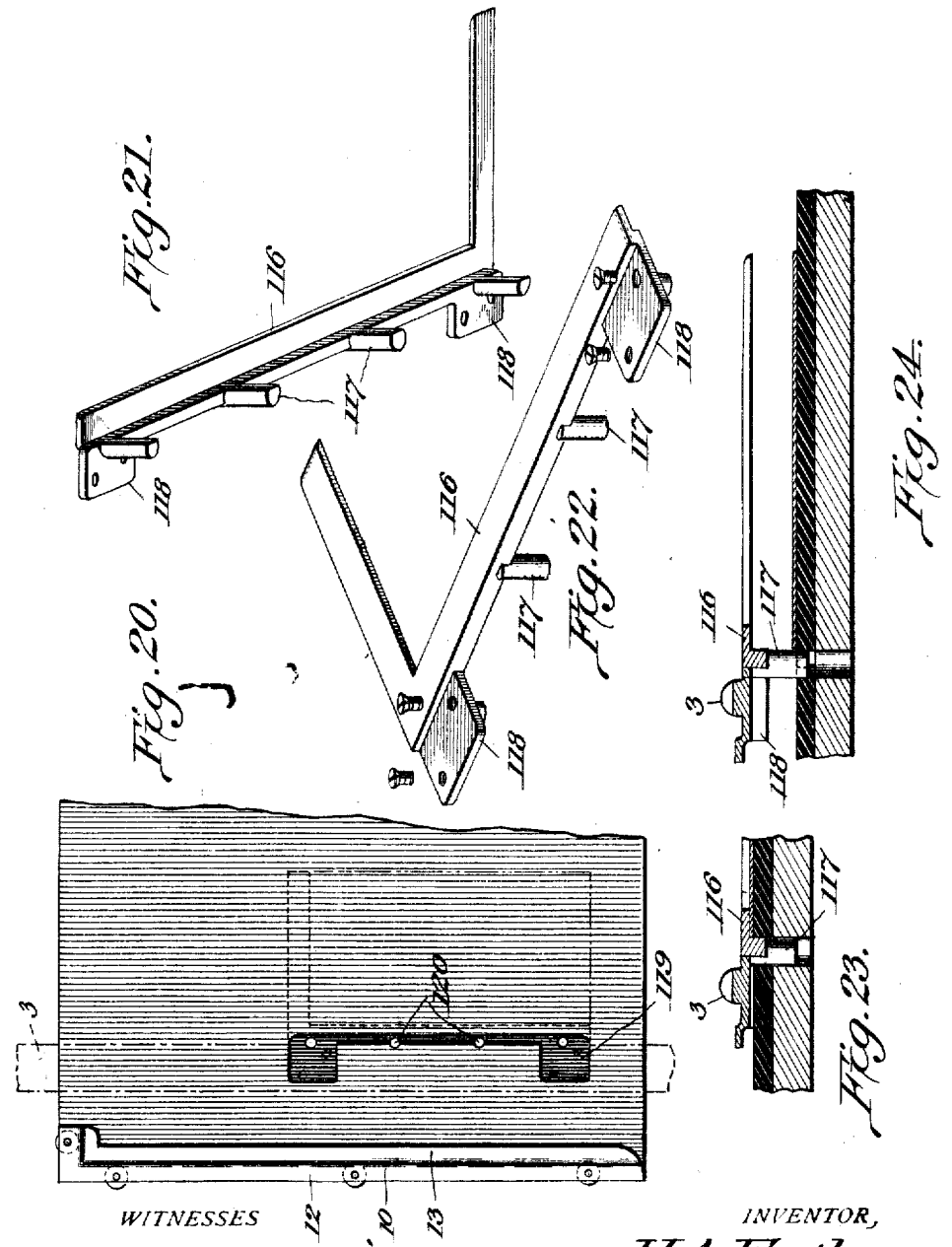

UNITED STATES PATENT OFFICE.

HARRY A. FOOTHORAP, OF HARRISBURG, PENNSYLVANIA, ASSIGNOR TO ELLIOTT-FISHER COMPANY, OF HARRISBURG, PENNSYLVANIA, A CORPORATION OF DELAWARE.

PLATEN AND PLATEN EQUIPMENT FOR TYPE-WRITING MACHINES.

1,268,954.     Specification of Letters Patent.     Patented June 11, 1918.

Application filed February 6, 1911. Serial No. 606,933.

*To all whom it may concern:*

Be it known that I, HARRY A. FOOTHORAP, a citizen of the United States of America, residing at Harrisburg, in the county of Dauphin and State of Pennsylvania, have invented certain new and useful Improvements in Platens and Platen Equipments for Type-Writing Machines, of which the following is a specification.

This invention relates to typewriting machines, and more particularly to a special equipment for what is known as a flat platen typewriter, said equipment being designed especially to facilitate condensed statement, toll slip and other forms of billing, as for instance by telephone companies.

One of the objects of the invention is to so combine and arrange a platen and a plurality of transfer mediums or web sections that the same may be brought into intimate relation with each other and with a plurality of work elements or expeditiously separated to facilitate the displacement, replacement or adjustment of the work sheets.

Another object is to place under the control of the operator's foot the manipulation of parts necessary to the accomplishment of the object first stated, to the end that the operator may be left the greatest possible freedom for the manipulation of the work sheets.

Another object is to facilitate condensed billing by mounting an adjustable gage or stop on the tape which in this type of machines is commonly employed to constitute an abutment for the folded edge of a statement blank.

A still further object is to provide an adjustable line space stop or lock which arrests the traveling machine at the proper point for the initial lines of writing on successive bills or statements and to so arrange said stop that the same may be automatically released by the operation of the line spacing mechanism in the event that a particular bill or statement requires more than a single line for the entry of the necessary data thereon.

To the accomplishment of the above recited objects and others which will more fully hereinafter appear, one embodiment of the invention resides in the construction and arrangement of parts illustrated in the accompanying drawings, described in the following specification, and succinctly defined in the appended claims.

In said drawings—

Figure 1 is a plan view of a platen constructed, arranged and equipped in accordance with my invention.

Fig. 1ª is a detail sectional view on the line a—a of Fig. 1.

Fig. 1ᵇ is a detail perspective view of the adjustable top gage for the folded form.

Fig. 2 is a bottom plan view of the subject-matter of Fig. 1.

Fig. 3 is a side elevation of the platen and of the typewriter mounted to travel thereover, portions of the platen frame being broken away to facilitate illustration and the positions of certain of the parts being indicated in dotted lines.

Fig. 3ª is a detail view of one of the machine gibs and the stop plate secured thereto.

Fig. 4 is a perspective view of the platen-operating treadle.

Fig. 5 is a sectional view of the platen-operating treadle with the parts locked in normal position.

Fig. 6 is a similar view of the treadle locked in depressed position.

Fig. 7 is a transverse section on the line 7—7 of Fig. 3 looking toward the front.

Fig. 8 is a similar view on the line 8—8 of Fig. 3 looking toward the rear.

Fig. 9 is a sectional view of one of the ribbon rolls and its mounting, a portion of the parts being broken out to facilitate illustration.

Fig. 10 is a transverse section designed to show more particularly the arrangement of the work sheets and ribbon.

Fig. 11 is a longitudinal section showing more particularly the relation of the platen and ribbon in the normal or elevated position of the platen.

Fig. 12 is a detail view of the guard plate secured at the front of the platen frame.

Fig. 13 is a perspective view of the typewriter frame and certain of the attached parts designed to show more particularly the arrangement of the tally strip supporting and feeding mechanism.

Fig. 14 is a longitudinal section through a portion of the platen, the typewriter frame and the tally strip supporting and feeding mechanism.

Fig. 15 is a detail view, partly in section, showing the means whereby the rearward movement of the machine frame effects the automatic spacing of the tally strip.

Fig. 16 is a perspective view of the line spacing mechanism and the line space stop.

Fig. 17 is a longitudinal sectional view of the platen with the parts in normal or writing position.

Fig. 18 is a similar view showing the platen dropped to space the transfer sections from each other and from the platen to facilitate replacement of the work sheets.

Fig. 19 is a similar view showing the platen arrested after a limited depression.

Fig. 20 is a plan view of a portion of the platen showing the manner in which the latter is cut out to accommodate the toll slip or card holder, the latter and the adjacent rail to which it is secured being shown in dotted lines.

Figs. 21 and 22 are detail perspective views of the toll slip holder.

Fig. 23 is a detail sectional view showing the relation of the toll slip holder and the platen when the latter is in normal elevated position, and Fig. 24 is a similar view with the platen depressed to release the toll slip and permit its replacement by another.

The machine here shown for illustrative purposes is what is known to commerce as the Elliott-Fisher flat platen typewriter exemplified in Patent No. 573,868.

In general the Elliott-Fisher machine embraces a flat platen associated with which are tracks or guides upon which travel, longitudinally of the platen, a machine frame upon which in turn is mounted a laterally movable carriage which supports key operated printing mechanism arranged to control the movement of the carriage through the medium of an escapement in a manner well understood in the art. Letter spacing is effected by the movement of the carriage on the machine frame and the lines of writing are spaced by moving the frame step by step over the platen.

For the purposes of the present disclosure, the machine proper is shown more or less diagrammatically, the keys, printing mechanism, etc., being entirely omitted. 1 indicates the main machine frame, 2 the carriage and 3 the tracks or guides upon which the frame 1 is mounted to travel back and forth. The tracks 3 are toothed for coaction with the line spacing mechanism, to be hereafter described. The tracks or guides 3 are rigidly mounted on what is termed the platen frame 4. In the present instance this frame comprises side plates 5 which directly support the tracks and are connected by front and rear transverse plates 6 and 7, see Figs. 2, 7 and 8, considerably narrower than the side plates to present their upper edges in a plane somewhat below that of the tracks. In addition to the side and end plates 5, 6 and 7, the frame also includes in the present instance a pair of inner side plates 8 each located adjacent to but somewhat removed from the plates 5 and secured at their ends to the end plates 6 and 7. The inner side plates 8 are somewhat narrower than the end plates and have their upper edges flush with the upper edges of the latter, the inner side plates and the end plates constituting a rectangular frame located within the confines of the platen frame proper and dropped somewhat below the upper edge thereof.

Upon this inner frame is designed to rest in its depressed position a vertically movable flat platen 9, see Fig. 18, which may and preferably does comprise a metal base $9^a$ having a hard rubber or other suitable covering $9^b$. The platen 9 is of considerably less length than the platen frame and is of sufficient width to extend through the side plates 5 which are cut out to accommodate it, as shown in Figs. 17 to 19. The right hand margin of the platen terminates practically flush with the outer surface of the platen frame, but the left hand edge of the platen is extended considerably beyond the platen frame and is equipped with a margin guide or gage 10 to facilitate the positioning of a work sheet 11, see Fig. 10, ordinarily known as the master sheet. The gage 10 is formed of metal and comprises an abutment 12 and a guard flange 13, the latter extending over and guarding the edge of the sheet positioned on the platen by the abutment. While this gage may be permanently secured to the platen, it is preferably detachably retained by set screws 14.

The platen 9 is designed to have considerable vertical movement while retaining its true horizontal position. The extent of this movement is shown by a comparison of Figs. 17 and 18 wherein it will be seen that the platen when in normal position is elevated to cause a work sheet imposed thereon to be clamped against the under sides of the tracks or guides 3 and when lowered the platen rests, as heretofore stated, upon the upper edges of the inner side bars 8 of the frame. The platen 9 is supported by an arrangement of levers similar to those employed in lazy tongs.

Depending from the platen adjacent to its respective corners are bearings 15. Between the two front bearings extends a shaft 16 from which in turn are extended a pair of inclined platen supporting levers 17 having their rear ends carried by a shaft 18 afforded bearings in the rear ends of the inner frame bars 8, see Figs. 2 and 11. To the bearings 15 are pivoted by stud shafts or screws 19 a pair of inclined levers 20 having their front ends carried by a transverse shaft 21 afforded bearings adjacent to the front ends of the bars 8. At the intersection of the oppositely inclined bars 17 and 20, said bars are connected by a transverse shaft 22 from which depend a pair of connecting rods 23 having their lower ends connected, as indicated in Fig. 4, to a treadle 24 mounted to swing from a fixed support as for instance one of the frame bars 25 of the metal table upon which the platen frame is usually supported. The platen is urged toward its elevated position by springs 26 having their upper ends secured to brackets 27 fixed to the frame bars 8 and having their lower ends attached to brackets 28 secured to the connecting rods 23, an additional spring 29 extended from a fixed part 30 being secured, if desired, to a cross bar 31 extending between the connecting rods 23.

The treadle 24 is conveniently located for operation by the foot of the machine operator, who, by depressing the treadle 24, will swing the platen supporting levers 17 and 20 through the connecting rods 23 and thus depress the platen from its normal position shown in Fig. 17 to its depressed position shown in Fig. 18. Upon the relief of the pressure upon the treadle 24 the springs 26 and 29 will restore the platen to its elevated or normal writing position, incidentally clamping the paper between the platen and the under sides of the rails. It is desirable to lock the platen in both its elevated and depressed positions and to have the locking means under the control of the operator's foot. I therefore equip the treadle 24 with two locking bails 32 and 33, one bail serving to lock the platen in its elevated position and the other serving to lock the platen when depressed. The bails 32 and 33 are mounted to swing from a rod 34 extended across the treadle and are yieldingly retained in elevated position by springs 35. Each locking bail is provided with a latch 36 or 37 coacting with a latch bar 38 in the form of a cross piece or head at the end of a bar 39 fixed, as shown in Fig. 4, to the table. By reference to Figs. 4, 5 and 6, it will be seen that when the treadle 24 is in its normal elevated position the latch 36 of the locking bail 32 will extend over the latch bar 38 thus preventing the platen from being accidentally depressed in the event of a weight being imposed thereon. When the operator desires to depress the platen, however, he places his foot on the locking bail 32 and by a continuous movement first operates the bail to withdraw the latch 36 and to then depress the treadle 24 and with it the platen. When the treadle has been thus depressed the latch 37 of the locking bail 33 will engage the under side of the latch bar 38 thus locking the treadle in its depressed position. The operator may now manipulate the work sheets and when he is ready to restore the parts to normal position, it is simply necessary for him to depress the bail 33 with his foot, thus releasing the treadle and allowing the springs 26 and 29 to restore the platen and treadle to their elevated positions where they are automatically locked by the latch 36 of the bail 32.

Under certain conditions, as for instance in making out toll slips, or where it is not necessary to remove or adjust the master sheet, it is sometimes desirable to limit the depression of the platen and to avoid the automatic locking of the latter in depressed position. To accomplish this result a pair of pivoted platen stops 40 are mounted on the inner sides of the frame plates 5 and are held in either of two positions by springs 41, the movement of the stops on their axes being limited by stop pins 42. By reference to Figs. 17 and 18, it will be seen that the platen stops 40 are normally held in inoperative positions, but if desired, these stops may be swung to the positions shown in Fig. 19 to arrest the downward movement of the platen about midway of its normal movement. When the platen is thus arrested by the stops 40 the treadle 24 will not have dropped sufficiently to allow the catch 37 to engage under the bar 38. Consequently when the platen stops are in use the platen will not be locked down and will immediately rise when the pressure on the treadle is relieved.

Disposed longitudinally of the platen, see Figs. 1 and 10, is a tape 43 which serves as a guide and abutment for the folded edge or bight of a folded form or work element 11ª. This tape is connected to transverse shafts 44 mounted in the side plates of the platen frame and urged by tension springs 45 to hold the tape taut. In the class of work referred to for the purposes of this disclosure the base or master sheet 11 is imposed directly on the platen and the folded form is located above the master sheet with its fold inclosing the tape and its opposite edge held by the left hand rail in coaction with the platen. These folded forms are sometimes used for statement work in what is known as condensed billing and successive forms are retained in progressive positions longitudinally of the platen so that entries made thereon by the typewriter will be transferred as a condensed record to the subjacent master sheet. To facilitate this progressive positioning of the folded forms the tape 43 is provided with an adjustable top gage 46 having the form of a metal plate having guide flanges 47 bent around the edges of the tape, an abutment flange 48 bent upward and extended across the tape and a spring end 49 having a projection or catch 50 adapted to engage in one of a series of holes 51 in the tape 43. By means of this top gage for the folded form the latter may be quickly positioned since its position in one direction is determined by the tape 43 while its position longitudinally of the platen is determined by the top guide 46 against which its upper edge is abutted. As successive forms are used the gage 46 is slipped forward until engaged with the next hole in the tape and this is repeated for each form.

For the purpose of transferring the impression made upon the top layer of the folded form to the lower layer of said form and to the base sheet, I provide an endless ribbon 52 passed around rollers 53 and 54 located beyond the front and rear edges of the platen 9 and having both its horizontal sections a and b disposed above the platen, as clearly shown in Figs. 17 to 19. The upper section a of the ribbon is disposed within the folded form 11ᵃ, that is to say, it extends longitudinally of the platen between the upper and lower sheets of the form. The lower section b of the ribbon is similarly disposed between the lower or duplicate sheet of the form and the subjacent ledger or master sheet 11. It will therefore appear that when matter is imprinted upon the bill sheet the record will be transferred through the upper section of the ribbon to the lower sheet of the folded form and through the lower section of the ribbon to the ledger sheet.

It will be noted by reference to Fig. 17 that when the parts are in their normal or writing positions, the platen 9 is sufficiently elevated to clamp the work sheets or elements against the under sides of the rails and that the writing surface of the platen is sufficiently elevated with respect to the rollers 53 and 54 to impart a downward inclination to those portions of the ribbon which extend to the rolls from the opposite ends of the platen. Furthermore, it will be noted that when the platen is dropped, as shown in Fig. 18, it will recede from the ribbon and that the horizontal sections of said ribbon will recede from each other, thus effecting a relative separation of the ribbon sections and platen to facilitate displacement and replacement of the work elements. In order to minimize the depression of the platen necessary to effect this separation of the ribbon sections and the complete recession of the platen therefrom, the lower section guide rolls 55 and 56 are located just beyond the opposite ends of the platen and with their upper surfaces somewhat elevated with respect to the lower sides of the rollers 53 and 54. These guide rollers 55 and 56 have their left hand ends journaled in the adjacent side plate of the platen frame and their right hand ends are journaled in bearings 57 supported by the transverse members 6 and 7, see Figs. 1, 7 and 8. Obviously, the dropping of the platen will create slack in the ribbon and it is equally obvious that this slack must be taken up and the horizontal sections of the ribbon held taut in order to properly facilitate clean and expeditious handling of the work sheets. For this reason both of the ribbon rollers 53 and 54 are mounted for bodily movement longitudinally of the platen and are placed under tension in opposite directions so that said rollers will recede and thus take up any slack which may be produced in the ribbon from any cause. Each of the rollers 53 and 54 is mounted to rotate freely on a shaft 58 or 59, each shaft having at its opposite ends fixed pinions 60 engaging the under sides of short stationary racks 61, see Figs. 3, 7, 8 and 9, the extremities of said shafts resting in longitudinal slots 62 in the side plates of the platen frame. The shafts 58 and 59 are constantly urged in opposite directions by springs 63 and 64 secured at their outer ends to pins 65 projecting from one of the side plates of the platen frame and having their inner ends coiled about and secured to the shafts 58 and 59, see Figs. 1, 7 and 8.

The construction and arrangement of the ribbon and platen as thus far described is original with me, but the drawings disclose in addition to the recited elements certain others coacting therewith to secure an endwise feed of the ribbon in a manner not contemplated by my invention. Briefly, the feed of the ribbon is effected in the following manner:

One of the flanges of the ribbon roller 54, to wit the one located at the rear end of the platen, see Figs. 17 to 19, is provided with a knurled periphery designed to be engaged by an eccentric dog 66 which, when in effective engagement with the roller 54, dogs said roller against rotary movement in one direction, towit the direction of the dotted arrow in Fig. 17. The dog 66 is mounted on a dog carrier 67 mounted to rock on the shaft 59 and having a straight top face 68 which is normally disposed at a slight angle with respect to the under side of the adjacent rail 3 with which said dog carrier is designed to contact when rocked upon the shaft 59. Similarly, the rear guide roll 56 is dogged against rotary movement in the direction of the dotted arrow in Fig. 17 by a spring urged dog 69, said roll being free to rotate in the opposite direction. The inner or front end of the dog 69 is extended somewhat to bring it within the path of the downward movement of the platen 1 in order that said dog will be engaged and moved to its releasing position as said platen approaches the downward limit of its movement, see Fig. 18. When the platen moves downward from its normal position, shown in Fig. 17, it will first reach the horizontal plane in which the upper sides of the ribbon rollers are located and continued movement of the platen will then cause the lower ribbon section *b* to separate from the upper ribbon section *a*, the slack produced being taken up by the recession of the ribbon rollers in accordance with my invention. The upper surface of the platen will then reach the horizontal plane in which the upper sides of the guide rollers 55 and 56 are located and the lower ribbon section will be sustained by said guides while the platen continues its downward movement to separate it from such lower section, as heretofore described. But for the provision of the dogs 66 and 69 this movement of the parts would not effect a feed of the ribbon, but it will be seen that as the ribbon rolls recede, the rotary movement of the rear roll 54 will by reason of its engagement with the dog 66 rock the dog carrier 67 and as the ribbon rolls reach a given position, the upper surface of the dog carrier will engage the under side of the rail thus arresting further movement of the carrier and rendering effective the action of the dog to prevent rotary movement of the roller 14 in the indicated direction. During the succeeding movement of the platen the lower ribbon section will recede from the upper section and create additional slack which must be taken up. We have seen, however, that the roll 54 has become automatically locked against further rotary movement in the direction of the arrow. Therefore, as the platen continues to recede, the roller 54 becomes in effect a direct connection between the rear end of the upper section of the ribbon and the spring 64. Said spring will therefore take up the slack produced in the ribbon, by drawing the roll 54 laterally, thereby taking up the slack occasioned in those portions of the ribbon lying between the opposite ends of the platen and the two rolls 53 and 54, the slack between the platen and the roll 53 being drawn around said roll. The power of the two springs 63 and 64 being equal, the effect of locking the rear roller 54 is that of a direct connection with the rear end of the upper ribbon section which continues around the front roll 53 and is in effect anchored to the platen and to the guide roll 56 by the friction between the ribbon and said elements. Therefore, upon the locking of the roller 54 in the manner described, the spring 64 overbalances the spring 63 in accordance with the well known principle of the movable pulley and during the rearward movement of the roller 54, subsequent to the locking thereof against rotary movement, the spring 64 takes up the slack in the ribbon, as stated. During this action the front roller 53 has no bodily movement, but rotates on a temporarily stationary axis, as the ribbon is drawn around it. As the platen continues to recede there will be no slacking of the ribbon, since the lower section of the latter will rest on the guide rolls and the only effect of the platen movement will be to cause said platen and the sheet imposed thereto to drop away from the ribbon. Finally, the platen will engage and release the dog 69.

The rear spring 64 having now lost the advantage which it gained over the spring 63, will now be overbalanced by the spring 63 which will cause the further recession of the front ribbon roller 53 from the platen, thus through the medium of the ribbon drawing the rear ribbon roller 54 toward the platen until the two springs 63 and 64 are again in counterbalancing relation with the two rollers equidistant from the positions occupied by them at the beginning of the operation. The longitudinal feed of the ribbon will now have been effected and the parts will be in the positions indicated in Fig. 18.

The provision for taking up the slack in the ribbon in a manner to effect an endwise feed thereof is not claimed herein, since the same is the invention of Eugene R. Goll and is described in his copending application No. 578,562. The specific construction of the ribbon rollers is not considered material, but by preference they comprise two flanged hubs 70 to which are secured the opposite ends of a sleeve 71 surrounded by a rubber or other suitable covering 72, the sleeve, covering and hubs being united by set screws 73. Each roller is confined against endwise movement by a set collar 74.

It has been stated that it is the practice in connection with certain classes of work to position successive bills or forms in progressive positions so that the first line of writing on these forms will be transferred to the master sheet just below the last succeeding entry on the latter. The top gage 46 facilitates the proper positioning of the sheets and it is equally desirable to provide means for arresting the traveling machine in corresponding progressive positions. To this end I mount at the right hand side of the platen frame a rack bar 75, see Fig. 3, provided with what are in effect ratchet teeth 76 on its under side. Slidably mounted on the rack bar 75 is a line space stop 77 in the form of a block recessed to accommodate the rack bar 75 and provided with a lock 78 carried by a headed plunger 79 mounted to slide vertically in the block 77 and urged upward by a spring 80 located in a spring seat in the block 77 and bearing against the under side of a head 79 of the plunger. The plunger head 79 projects above the block and from the lock 78 is extended a finger piece or handle 81 by means of which the lock may be moved against the resistance of the spring 80 to release the block or stop 77. It will be understood of course that the stop is shiftable along the rack bar 75 and that it is locked against forward movement by the engagement of the lock 78 with a straight face of one of the rigid teeth 76. Further forward movement of the stop may be effected by moving the lock 78 out of engagement with the bar either by the depression of the plunger 79 or the finger piece 81. Rearward movement of the block, however, may be effected by slight pressure thereon, since the lock 78 will merely ride over the inclined faces of the teeth 76.

Coacting with the block 77 is a line stop plate 82, see Figs. 3 and 3ª, which may be and preferably is carried by one of the gib plates 83 secured to the main frame 1 of the typewriter and by means of which said frame is gibbed to the rails. To facilitate the proper location of the stop 77, the latter is provided with a pointer 84 which moves along a series of graduations or scale 85 on the upper surface of the rack bar. The holes 51 in the tape 43 and the teeth 76 of the rack bar 75 are correspondingly spaced so that when the top gage 46 and the line space stop 77 are correspondingly located, the machine, when brought forward from the machine support in rear of the platen, will be arrested by the stop and the printing point of the typewriter will be in proper position for the first line of writing on the bill or statement. When the machine is moved back again and the folded form is removed, it is merely necessary to advance the top gage 46 and the stop 77 one space, after which a new sheet is placed in position and the machine is brought forward and arrested at the proper point for the entry thereon.

It sometimes happens that the entry to be made on the bill or statement will require more than a single line of writing. Provision is therefore made whereby, in that event, the machine may be line spaced and the stop 77 automatically released from the rack bar 75 so that said stop will not prevent this necessary extra line space movement of the machine. This provision includes an auxiliary line space lever 86 which, in addition to its function as an element of the line spacing mechanism, effects the depression of the plunger 79 and the consequent release of the stop 77 immediately prior to the beginning of the line space movement of the machine. Aside from its coaction with the plunger 79 of the machine stop 77 the auxiliary line space lever 86 is similar to that shown in the copending application of G. F. Watt, No. 475,628 and need therefore be described but briefly so far as its function as a line spacing element is concerned.

Referring to Fig. 16, 87 is the usual spacing shaft which extends across the front of the machine frame 1 and carries pinions 88 which engage the toothed tracks or rails 3. This shaft 87 is given a partial rotation by the initial movement of a line space lever 89 carried by an oscillating arm 90 and arranged to engage the knurled periphery of a disk 91 secured to the shaft 87. The auxiliary line space lever 86 is mounted to rotate loosely on the extremity of the shaft 87 where it is confined by a nut 91' and is provided with a rearwardly extending arm 92, see Fig. 3, having a lateral projection 93. The lateral projection 93 of the auxiliary line space lever is normally spaced a considerable distance in rear of the primary line space lever 89 so as to permit considerable forward movement of the lever 86 before said projection comes into contact with the lever 89. This preliminary movement of the lever 86, prior to the line spacing of the machine by its actuation of the lever 89, is afforded in order that a cam 94 with which the lever 86 is provided may engage and depress the plunger 79 and thus unlock the machine stop 77 before the forward movement of the machine commences. Obviously, therefore, if it is necessary to print more than a single line on any bill, the machine which has been arrested by the stop 77 may be released and line spaced by the manipulation of the lever 86. After the sheet thus posted has been removed, the stop 77 is moved forward one space in the usual manner and the top or statement gage is moved forward one space plus as many additional spaces as additional lines have been written on the last sheet. The lever 86 may be said to constitute not only a line space lever, but a machine stop release lever as well.

In Figs. 13 and 14 I have shown a tally attachment such as is ordinarily employed in connection with machines of this character. I shall first describe the general features of the attachment which are well known and are disclosed in the application of George F. Watt, hereinbefore identified, and shall then describe a specific tally feeding mechanism devised by me.

Mounted in front and rear of the machine frame 1 are tally supporting frames 95 and 96. In the former is mounted a tally roll 97 from which the tally strip 98 extends under the machine frame and thence between a feed roll 99 and a pressure roll 100 mounted in the rear frame 96. The tally strip 98 is fed rearwardly from the roll 97 by the rotation of the roll 99. The shaft 101 of the roll 99 has fixed thereto a ratchet 102 engaged by a pawl 103 on an oscillatory pawl carrier 104 loose on the shaft and urged against a stop 105 by a spring 106. The pawl carrier 104 is connected by a link 107 to one arm of a crank shaft 108 another arm of which is connected by a link 109 to the arm of a crank shaft 110 journaled at the front of the frame 1 and having an arm 111 disposed to be engaged by a pin 112 projecting from the lever 86. Upon the operation of the lever 86 to release the machine stop 77 and line space the machine the pin 112 carried by said lever will engage the arm 111 and thus swing the crank shafts 110 and 108 and the pawl carrier 104 to cause the pawl 103 to engage and rotate the ratchet 102 and thereby effect a partial rotation of the feed roll 101 to feed the tally strip 98 rearwardly.

It is not original with me to provide an auxiliary line space lever for simultaneously line spacing the machine and the tally strip, but I believe I am the first to provide means whereby, upon the operation of a lever or other part, a machine stop is released and the machine and tally strip are line spaced. A further novel feature resides in the illustrated means whereby the tally strip will be line spaced automatically when the machine is moved back from the writing surface. The utility of this additional provision will be seen when it is remembered that if the successive bills are to have an entry consisting of a single line, no necessity will arise for the line spacing of the machine by the lever 86.

Depending from the pawl carrier 104 is a pivoted arm 113 arranged to swing freely in a rearward direction, but rigid with the pawl carrier 104 when urged forwardly beyond its normal position by the engagement of its upper end with a pin 113ˣ, see Fig. 15. Arranged to coact with the arm 113 is a pin 114 projecting from the platen frame, as clearly shown in Fig. 8. When the machine is moved back and the arm 113 engages the pin 114, the pawl carrier 104 will be operated to feed the tally in an obvious manner and in the event that the arm 113 engages the pin 114 during the advance of the carriage, said arm will ride idly over the pin without effecting any operation of the tally line spacing devices. It will thus be seen that provision is made for line spacing the tally whenever the machine is moved back preparatory to the insertion of a new bill or statement and that when more than a single line is entered upon any one bill the tally strip will be line spaced by the manipulation of the lever 86.

115 indicates a clamp adjustably secured to the rear transverse frame bar 7 at the right hand side of the tape 43 and extended over the platen in position to engage and clamp the upper margin of the master sheet 11 when the platen is raised. As the platen here shown is more particularly intended for telephone posting, provision is made for the retention of toll slips or cards in writing position. The toll slip holder is in the form of an angular clamp 116 provided with depending gage pins 117 and with securing lugs 118 which latter are adapted to be screwed to the under side of the left hand rail. For the accommodation of those parts of the clamp lying below the clamping face the platen is cut away, as indicated at 119, and is furthermore provided with sockets 120 for the reception of the gage pins 117. When the platen is used for toll slip work the platen stops 40 are moved to their operative positions, shown in Fig. 19, and the ribbon is removed. With the stops 40 thus positioned the platen is not permitted to drop a sufficient distance to entirely clear the gage pins 117 which therefore act as a gage to facilitate the proper placing of the toll slip in position to be clamped by the toll slip clamp when the platen is again allowed to rise.

What I claim is:—

1. The combination with a stationary support and work holding means, of a platen movably carried by the support and coacting with the work holding means, means for moving the platen away from the work holding means, a locking device for retaining the platen in the position to which it is moved, and means for operating the locking device and the platen moving means.

2. The combination with a stationary support and work holding means, of a platen movable toward and from the work holding means and coacting therewith to retain a work sheet, manually operated means for moving the platen, and a lock retaining the platen in the position to which it is moved and operated by said manually operated means.

3. The combination with a support and work holding means carried thereby, of a platen movable toward and from the work holding means and coacting therewith to hold the work, platen moving means, locking devices each arranged to hold the platen in one position, and a plurality of manually operated devices carried by the platen moving means and each arranged to operate one of the locking devices.

4. The combination with a support, of a platen movable toward and from the writing plane, means for moving the platen and variable means for arresting the platen at different predetermined points in its movement to facilitate the handling of different classes of work.

5. The combination with a stationary support and work holding means, of a platen carried by the support and movable into and out of coactive relation with the work holding means, means for moving the platen away from the work holding means to a predetermined position, and means movable into and out of position to arrest said platen before such pre-determined position is reached.

6. The combination with stationary tracks or guides for a traveling writing machine, of a longitudinally disposed work engaging member located between and spaced from said tracks or guides, and a work gage adjustable along said work engaging member.

7. The combination with a platen, of a tape disposed thereover, and a work gage carried by said tape.

8. The combination with a flat platen, of a tape disposed thereover, and a work gage carried by and adjustable along said tape.

9. The combination with a platen, of a work engaging tape extended thereover, and a work gage adjustable along the tape and having retaining means coacting with the tape to hold the gage in its adjusted positions.

10. The combination with a stationary support for a traveling machine, of a vertically movable platen, a work clamp carried by the support, and a work gage extended downwardly from the work clamp.

11. The combination with track or guides for a traveling writing machine, of a vertically movable platen associated with said tracks or guides, and a work gage carried by the platen beyond the outer side of one of said tracks or guides.

12. The combination with a work clamp, of a platen movable toward and from the clamp, means for moving the platen, means for locking the platen, and a common actuator for the moving and locking means.

13. The combination with a work clamp and a platen movable toward and from the clamp, of means for moving the platen, a plurality of devices for locking the platen in different positions, and operating devices each of which is common to a locking device and to the platen moving means.

14. The combination with a platen movable from the writing plane, means for locking the platen at the limit of its normal movement, and means movable into and out of position to arrest the platen before the latter moves a sufficient distance to be locked.

15. The combination with a stationary support for a traveling machine, a work clamp carried by the support and a work gage extended downwardly from the work clamp, of a depressible platen coacting with the work clamp to hold the work and movable downwardly away from the clamp to permit the work to be interposed between the platen and clamp and against the work gage.

16. The combination with a work clamp and a work gage extending downwardly therefrom, of a platen movable toward and from the work clamp and having interfitting relation with the work gage.

17. The combination with a vertically movable platen having an aperture, of a work clamp coacting with the platen and a work gage associated with the work clamp and extended into the aperture in the platen.

18. The combination with a work clamp and a platen movable toward and away from said clamp, of platen moving means, means for locking the platen at its limit of movement, and means movable into and out of position to arrest the platen before the latter has moved a sufficient distance to be locked.

In testimony whereof I affix my signature in presence of two witnesses.

HARRY A. FOOTHORAP.

Witnesses:
J. F. CALVERWELL,
R. M. PARKER.